(12) United States Patent
Postrel

(10) Patent No.: US 9,847,032 B2
(45) Date of Patent: Dec. 19, 2017

(54) SYSTEM AND METHOD FOR AUTOMATED TRAFFIC MANAGEMENT OF INTELLIGENT UNMANNED AERIAL VEHICLES

(71) Applicant: Richard Postrel, Miami Beach, FL (US)

(72) Inventor: Richard Postrel, Miami Beach, FL (US)

( * ) Notice: Subject to any disclaimer, the term of this patent is extended or adjusted under 35 U.S.C. 154(b) by 433 days.

(21) Appl. No.: 14/800,250

(22) Filed: Jul. 15, 2015

(65) Prior Publication Data

US 2016/0328979 A1 Nov. 10, 2016

Related U.S. Application Data

(60) Provisional application No. 62/024,934, filed on Jul. 15, 2014.

(51) Int. Cl.
| | |
|---|---|
| *G08G 5/04* | (2006.01) |
| *G08G 5/00* | (2006.01) |
| *B64C 39/02* | (2006.01) |
| *G05D 1/10* | (2006.01) |

(52) U.S. Cl.
CPC ......... *G08G 5/0043* (2013.01); *B64C 39/024* (2013.01); *G05D 1/101* (2013.01); *G08G 5/0008* (2013.01); *G08G 5/0013* (2013.01); *G08G 5/0021* (2013.01); *G08G 5/0026* (2013.01); *G08G 5/0034* (2013.01); *G08G 5/0039* (2013.01); *G08G 5/0069* (2013.01); *B64C 2201/128* (2013.01); *B64C 2201/145* (2013.01)

(58) Field of Classification Search
CPC .. G08G 5/0039; G08G 5/0021; G08G 5/0043; G08G 5/0008; G08G 5/0013; G08G 5/0026; G08G 5/0034; G08G 5/0069; B64C 39/04; G05D 1/101
See application file for complete search history.

(56) References Cited

U.S. PATENT DOCUMENTS

| | | | |
|---|---|---|---|
| 5,521,817 A | 5/1996 | Burdoin et al. | |
| 7,512,462 B2 * | 3/2009 | Nichols | G05D 1/101 340/945 |
| 8,082,102 B2 * | 12/2011 | Ravenscroft | G01C 21/005 701/2 |
| 8,909,391 B1 * | 12/2014 | Peeters | G05D 1/0027 701/2 |

(Continued)

*Primary Examiner* — Thomas G Black
*Assistant Examiner* — Peter D Nolan
(74) *Attorney, Agent, or Firm* — Anthony R Barkume

(57) ABSTRACT

A drone traffic management system comprising a computer comprising memory means for storing origin coordinates indicating an origin location of a drone, destination coordinates indicating a destination of the drone, and traffic management factors located between the origin location of the drone and the destination of the drone; and processing means for controlling the flight of a drone. This is accomplished by calculating a flight path for the drone to fly automatically from the origin location to the destination location without manual intervention, sending the flight path to the drone, receiving location data of the drone as it travels from the origin location to the destination, re-calculating the flight path of the drone as a function of the traffic management factors and the location data of the drone, and sending the re-calculated flight path to the drone.

2 Claims, 13 Drawing Sheets

(56) References Cited

U.S. PATENT DOCUMENTS

| | | | |
|---|---|---|---|
| 9,334,052 B2* | 5/2016 | Pasko | B64C 39/024 |
| 9,384,668 B2* | 7/2016 | Raptopoulos | G08G 5/0069 |
| 2006/0106506 A1* | 5/2006 | Nichols | G05D 1/101 701/3 |
| 2009/0210109 A1* | 8/2009 | Ravenscroft | G01C 21/005 701/26 |
| 2009/0219393 A1 | 9/2009 | Vian et al. | |
| 2013/0345920 A1 | 12/2013 | Duggan et al. | |
| 2014/0032034 A1 | 1/2014 | Raptopoulos et al. | |
| 2014/0142787 A1* | 5/2014 | Tillotson | H04B 7/18506 701/3 |
| 2014/0163852 A1 | 6/2014 | Borri et al. | |
| 2014/0316616 A1* | 10/2014 | Kugelmass | G05D 1/101 701/8 |
| 2015/0336668 A1* | 11/2015 | Pasko | B64C 39/024 701/2 |
| 2016/0111006 A1* | 4/2016 | Srivastava | G08G 1/00 701/3 |
| 2016/0163204 A1* | 6/2016 | Raptopoulos | G08G 5/0069 701/3 |
| 2016/0196525 A1* | 7/2016 | Kantor | G08G 5/0013 705/330 |
| 2016/0300495 A1* | 10/2016 | Kantor | G08G 5/0039 |

* cited by examiner

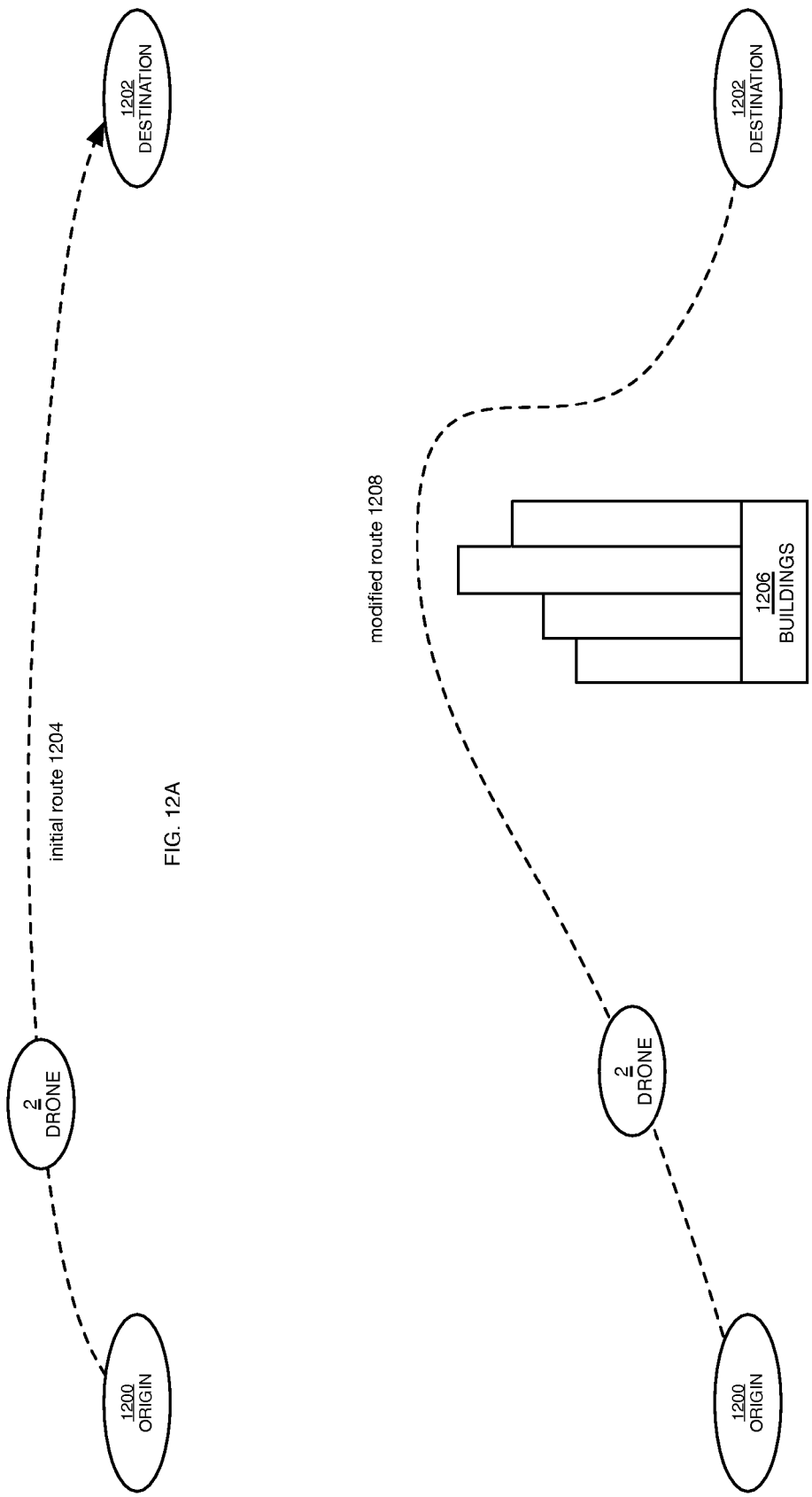

SYSTEM AND METHOD FOR AUTOMATED TRAFFIC MANAGEMENT OF INTELLIGENT UNMANNED AERIAL VEHICLES

TECHNICAL FIELD

This invention relates to traffic management for unmanned aerial vehicles, also known as drones.

BACKGROUND OF THE INVENTION

Unmanned aerial vehicles (UAV), also referred to as drones, are small aircraft that are able to take off, fly, and land without a human pilot onboard. The flight of a drone is controlled either autonomously by onboard computers or by the remote control of a pilot on the ground or in another vehicle.

Recent advances in drone technology has brought forth the promise of drone-based automatic package delivery systems. For example, the online merchant AMAZON (www.amazon.com) has recently announced a service that it intends to commercialize referred to as PRIME AIR. According to AMAZON, its planned PRIME AIR service would enable drones to deliver small packages (e.g. less than five pounds) to a destination within about 20 km (12 miles) from local AMAZON fulfillment centers. AMAZON claims an intention to provide such personal delivery within 30 minutes of a customer's order.

A large problem in providing such a drone-based delivery system is of course the management of drone traffic, in particular as the number of drones employed increases. Since it is desired to be able to automate the delivery, it is envisioned that humans will have little or no interaction with the drone as it makes its way to and from its destination. Without appropriate traffic management in place, accidents between drones and structures, people, animals, and other drones will likely proliferate. This is of particular concern to governmental entities that control airspace such as the Federal Aviation Administration (FAA).

SUMMARY OF THE INVENTION

Provided is a drone traffic management system comprising a computer comprising memory means for storing origin coordinates indicating an origin location of a drone, destination coordinates indicating a destination of the drone, and traffic management factors located between the origin location of the drone and the destination of the drone; and processing means for controlling the flight of a drone. This is accomplished by calculating a flight path for the drone to fly automatically from the origin location to the destination location without manual intervention, sending the flight path to the drone, receiving location data of the drone as it travels from the origin location to the destination, re-calculating the flight path of the drone as a function of the traffic management factors and the location data of the drone, and sending the re-calculated flight path to the drone.

The traffic management factors may include for example weather parameters, natural barrier locations, and/or man-made barrier locations. In addition, when more than one drone is present, the traffic management factors includes a flight path of the second drone.

In this drone traffic management system, the computer may be stationary with respect to the drone, or it may be located onboard a second drone that is in motion with respect to the drone.

In several embodiments described herein, the processing means is adapted to control the flight of a plurality of drones. For example, one of the plurality of drones may be a roving sector drone, and wherein the computer is located onboard the roving sector drone.

BRIEF DESCRIPTION OF THE DRAWING

FIGS. 12a-12c illustrate the dynamic routing of a drone based on various factors.

DESCRIPTION OF THE INVENTION

Drone System Topology

Single Drone Transport

Figure 1:
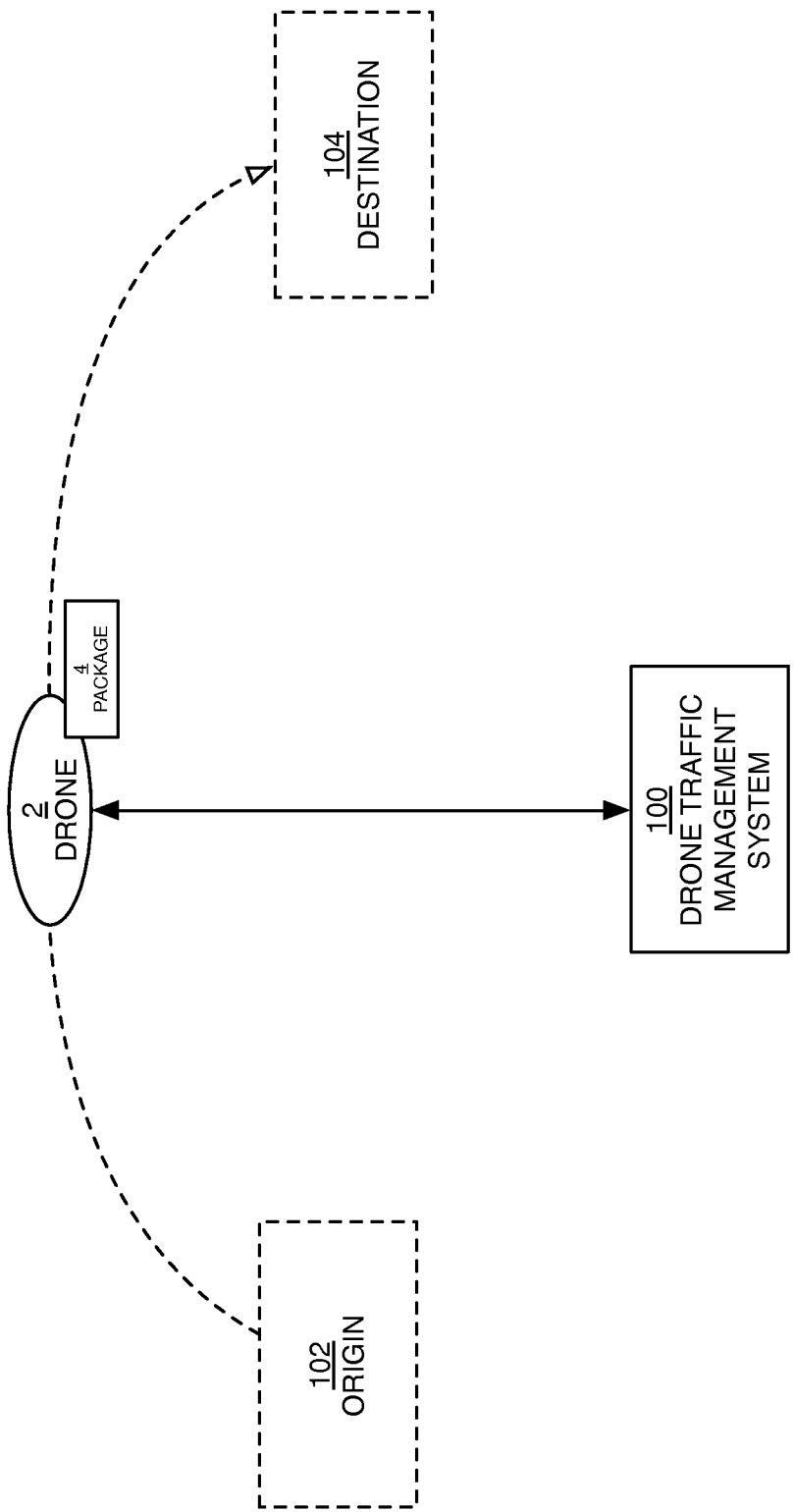
FIG. 1 is a block diagram illustrating a first embodiment in which an individual drone transporting a package from an origin to a destination is controlled by the drone traffic management system of the present invention.

The present invention is directed towards an automated drone traffic management system that will overcome the problems of the prior art with respect to managing automated or semi-automated drone traffic, such as but not limited to their use in drone-based delivery systems. FIG. 1 is a block diagram illustrating a first embodiment in which an individual drone transporting a package from an origin to a destination is controlled by the drone traffic management system 100 of the present invention. The drone traffic management system 100 as shown in FIG. 1 is typically one or more computers such as but not limited to a desktop computer, laptop computer, server computer, mobile computer (such as an IPHONE or ANDROID based device), tablet computer (such as an IPAD), etc. Any type of computing device that implements circuitry and programming suitable to carry out the functions of the inventions described herein would be applicable to the present invention. This would include, for example, wireless communications circuitry for communicating wirelessly with a drone while it is stationary or in transit, processing circuitry, data storage and memory, as well as network communications circuitry (which may be wired or wireless as known in the art), user input devices, output devices such as displays and combination input/output devices such as touch screens.

Figure 7:
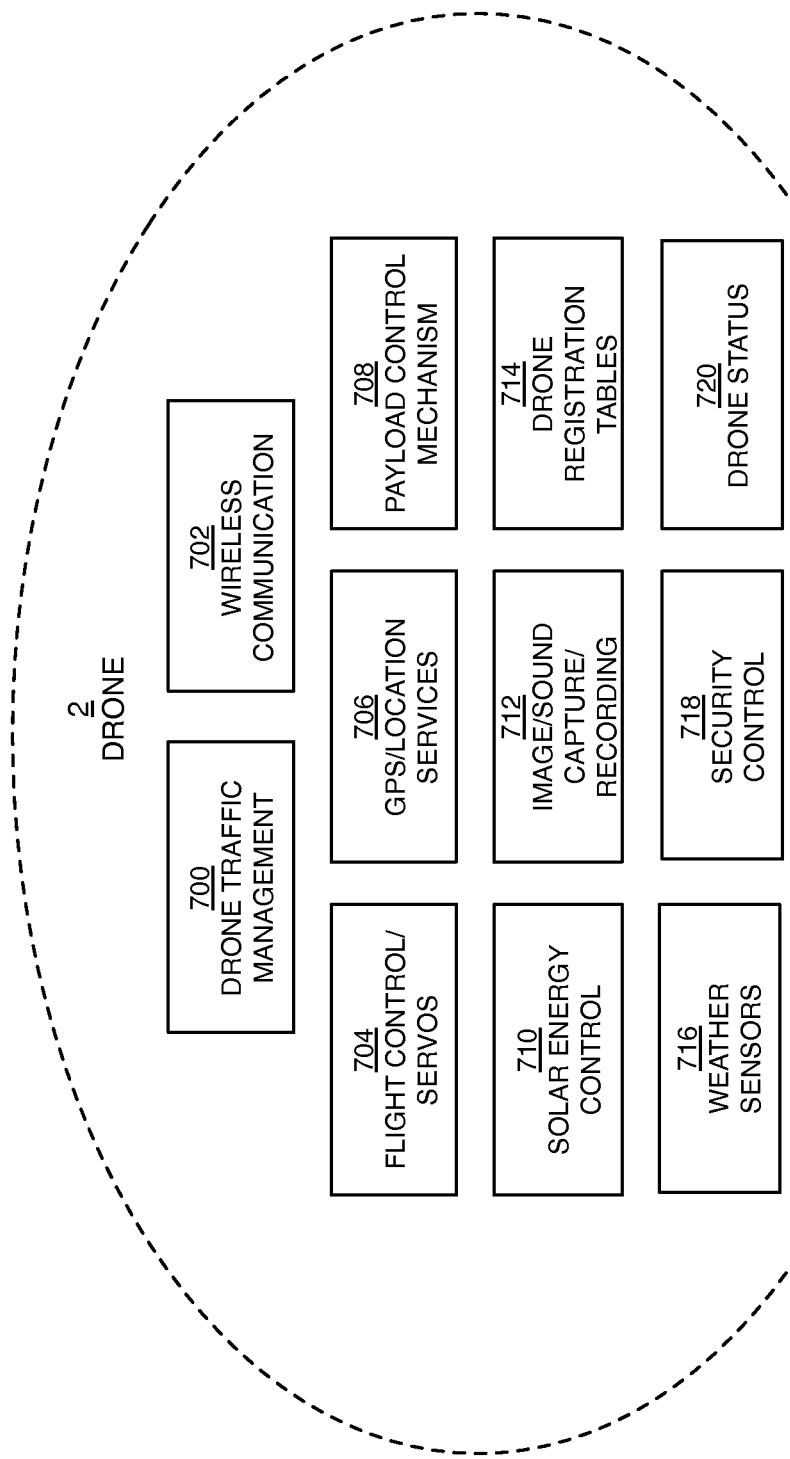
FIG. 7 is a block diagram of a drone utilized with the present invention.

The drone traffic management system 100 communicates wirelessly with a drone 2 as it travels from a point of origin 102 to a destination 104. Optionally, the drone 2 may be carrying a package 4 or other payload. Drones 2 are generally known in the art, and are also known as unmanned aerial vehicles. These drones may be adapted in accordance with the present invention to execute the functionalities that will be described with respect to the various embodiments described herein. FIG. 7 is a block diagram of a drone 2 utilized with the present invention. As shown in FIG. 7, these drones include various functional blocks such as drone traffic management 700, wireless communications 702, flight control and servos 704, GPS and location services 706, a payload control mechanism 708, solar energy control 710, image and sound capture and recording 712, drone registration tables 714, weather sensors 716, security control 718, and drone status 720, all of which will be described in further detail herein.

In this simple first embodiment, the individual drone 2 is transporting a package from an origin 102 to a destination 104 and is controlled by the drone traffic management system 100. The drone traffic management system 100 knows the coordinates of the origin 102 and the destination 104, and from that information can calculate a simple flight path for the drone to follow. Various traffic management factors will be considered by the drone traffic management system 100, such as current weather (wind, temperature, rain, snow), and/or natural or manmade barriers that may be in the intended flight path of the drone between the origin 102 and destination 104 (e.g. buildings or trees), and the like. These traffic management factors will be discussed in further detail herein with respect to the flowchart in FIG. 11. In a simple, case, assuming that there are no substantial traffic management factors to consider, then the flight path will be calculated on a substantially straight line from the origin to the destination. The altitude of the flight may be a factor of various parameters as will be described, in addition to any regulatory parameters that may exist such as FAA regulations. These parameters would be programmed into or accessible remotely by the drone traffic management system 100 to ensure that the planned flight path is in compliance with such regulations. The drone traffic management system 100 interacts with the drone 2 to read its position in real time by receiving location data from the GPS and location services 706 of the drone 2 and re-calculating a preferred flight path of the drone as it travels. That is, traffic management factors may change as the drone travels from the origin to the destination, which may affect the flight path calculated by the drone traffic management system 100.

Thus, instantaneous modifications may be made and communicated back to the drone as desired. This is explained in further detail with respect to FIG. 11 below.

Multiple Drone Transport

Figure 2:
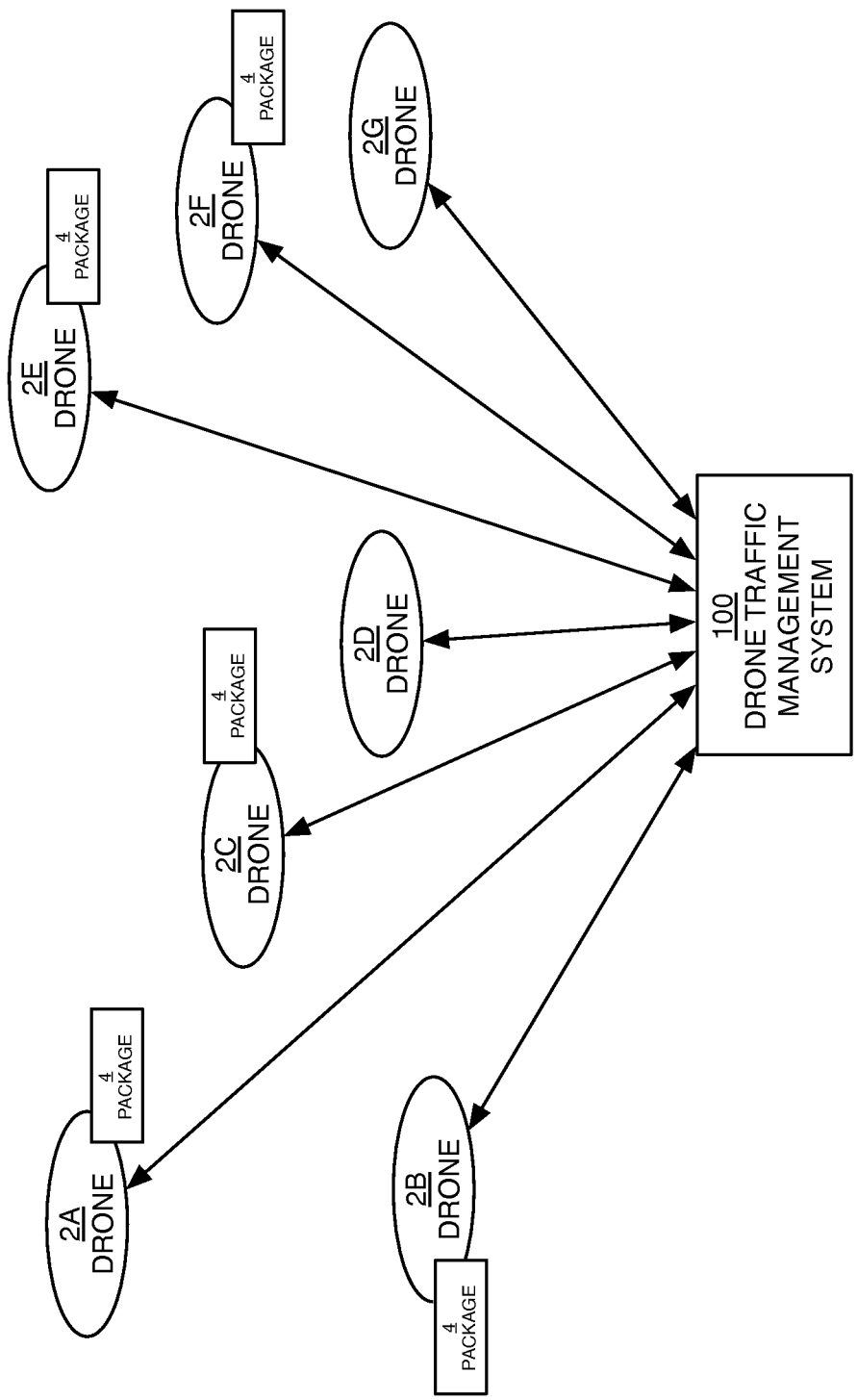
FIG. 2 is a block diagram illustrating a second embodiment in which multiple drones are controlled by the drone traffic management system of the present invention.

FIG. 2 is a block diagram illustrating a second embodiment in which multiple drones are controlled by the drone traffic management system 100 of the present invention. In this second embodiment, multiple drones are referred to as drone 2A, drone 2B, drone 2C, drone 2D, drone 2E, 2F, and drone 2G. Of course, many more drones may be implemented in this system. The drones are substantially the same as each other, except that each has a unique identifier/ address (drone ID 1000 in FIG. 10) that enables it to be uniquely identified and addressed by the drone traffic management system 100 as well as by each other if desired. Common drone functions will be referred to generically herein as drone 2, which may refer to any drone in the system unless otherwise specified. Some of the drones 2 illustrated in FIG. 2 are carrying a payload such as package 4, but this is not a requirement of the system.

As indicated above, each of the drones 2 is uniquely identified and addressed by the drone traffic management system 100. This enables the drone traffic management system 100 to communicate with individual drones if desired. In addition, the drone traffic management system 100 may issue a broadcast message in which all drones in the system (or logical groupings of drones such as sectors or zones) may listen and optionally respond to. For example, the drone traffic management system 100 may issue a broadcast command to all drones to flash an external red light, or the like.

The flight management of each of the multiple drones 2 of FIG. 2 may be implemented in the same manner as the single drone system of FIG. 1, which takes into account various factors such as current weather (wind, temperature, rain, snow), and/or natural or manmade barriers that may be in the intended flight path of the drone between the origin 102 and destination 104 (e.g. buildings or trees), and the like, as described in more detail below with respect to FIG. 11. In addition, this embodiment will consider the presence of other drones being controlled by the drone traffic management system 100. For example, if drone 2A is provided with a certain flight path, then the drone traffic management system 100 will ensure that the flight paths provided to all of the other drones 2B, 2C, 2D, 2E, 2F and 2G does not interfere with the path of drone 2A. Likewise, all flight paths of the drones in the system will be cross-referenced with each other by the drone traffic management system 100 to ensure there are no conflicts that may lead to collisions or the like. This may require the drone traffic management system 100 to alter the planned route of a given drone, or change its time of departure, or its speed, etc.

Multiple Drone Transport Controlled by Roving Sector Drones

Figure 3:
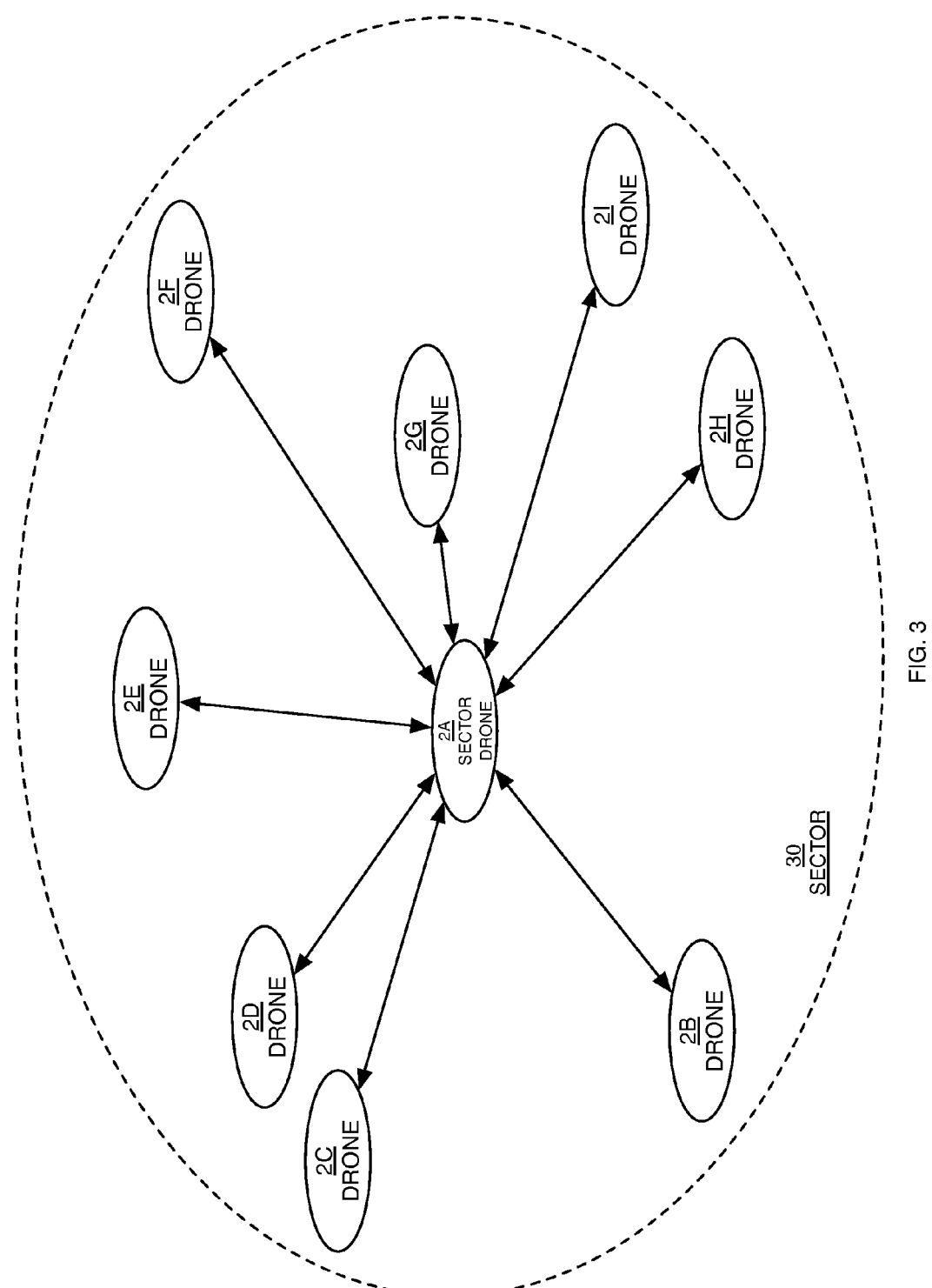
FIG. 3 is a block diagram illustrating a third embodiment in which multiple drones are controlled by a sector drone of the present invention.

FIG. 3 is a block diagram illustrating a third embodiment in which multiple drones are monitored and/or controlled by a roving sector drone of the present invention. It is recognized that while use of a stationary drone traffic management system 100 is satisfactory in many situations, there may be instances in which the stationary drone traffic management system 100 may be replaced or supplemented by a roving sector drone 2A as shown in FIG. 3. This sector drone 2A is able to rove about with or near a group of transitory drones 2B, 2C, 2D, 2E, 2F, 2G, 2H, 2I (referred too herein as a sector 30). Sectors refer to three-dimensional regions having a certain volume in which the drones are travelling, including dimensions of height, length and width. Theses three dimensional sectors may not be perfect geometrical shapes and will vary in accordance with the capabilities of the constituent drones as well the routes in which they are travelling.

Sectors may define different layers of drones since there is a height component to them. Different layers of drones maybe assigned to different tasks if desired. For example, layers having relatively lower altitudes may be assigned higher priority tasks, such as delivery of medicines to remote areas, while lower priority tasks may be carried out by drones at higher altitudes, such as routine document delivery. Drones from sectors having a higher altitude (and lower priority) would need permission to cross through the higher priority zones in order to take off and land when desired. Such permission may be obtained for example from the sector drones through which the lower priority drones cross, and/or the sector drone, master drone or drone traffic management system 100.

As this sector 30 of drones may be traveling across a large expanse of territory, the use of the roving sector drone 2A enables functionality that is not easily provided by the drone traffic management system 100 acting alone. In FIG. 3, sector 30 defines a group of drones 2A, 2B, 2C, 2D, 2E, 2F, 2G, 2H, and 2I. A sector may be generally configured to include a certain number of drones that are traveling near each other at a given point in time. In a simple example, drones depart from a product distributor and all are targeted to land with a block or two of each other at around the same time. As such, these drones will generally be traveling near each other at most times, and are defined as being a sector of drones. The size and footprint of a sector may be defined as desired.

One advantage of using a sector drone 2A that is located near the other drones is that the wireless communications is made simpler. That is, the distance requirements of the wireless communications between the drones and the drone traffic management system 100 are greater when the drones are farther away from the drone traffic management system 100 than when they are relatively nearer to the drone traffic management system 100. As the sector of drones travel past a certain point, wireless communications with the drone traffic management system 100 may be rendered nonfunctional. Thus, by assigning one of the drones in a sector the function of a sector drone, that sector drone can manage the flights of the neighboring drones with the same functionality of the drone traffic management system 100. In the example shown in FIG. 3, drone 2A has been assigned the task of being the sector drone as the drone sector 30 consisting of 2A through 2I travels away from the drone traffic management system 100. In order for the drone 2A to function as a sector drone, it will contain much of the intelligence possessed by the drone traffic management system 100 with respect to calculating and managing the flight paths of the drones as described above. Since the sector drone 2A is also located in the near vicinity of the other drones, it could also use data sensed by its onboard sensors (e.g. weather) to assist in determining the appropriate flight paths without necessarily requiring the other drones to provide that sensed information.

A drone 2 may be assigned the role of a roving sector drone 2A based on its physical location in proximity to the other drones in a given sector. Thus, in the example of FIG. 3, the drone 2A is physically located near the general center of the sector 30 of drones 2A through 2I. This may be determined by the drone traffic management system 100 at some point, such as when the flight paths of the drones are being calculated, or at some later point such as when they are in flight. In the alternative to using the drone traffic management system 100, the drones themselves may interoperate with each other to ascertain, as a group, which drone is most centrally located, and then that drone is assigned the role of being the sector drone for at least part of the time that the drones are in flight. This may be modified as will now be described with respect to FIG. 4.

Sector Drone Handoff

Figure 4:
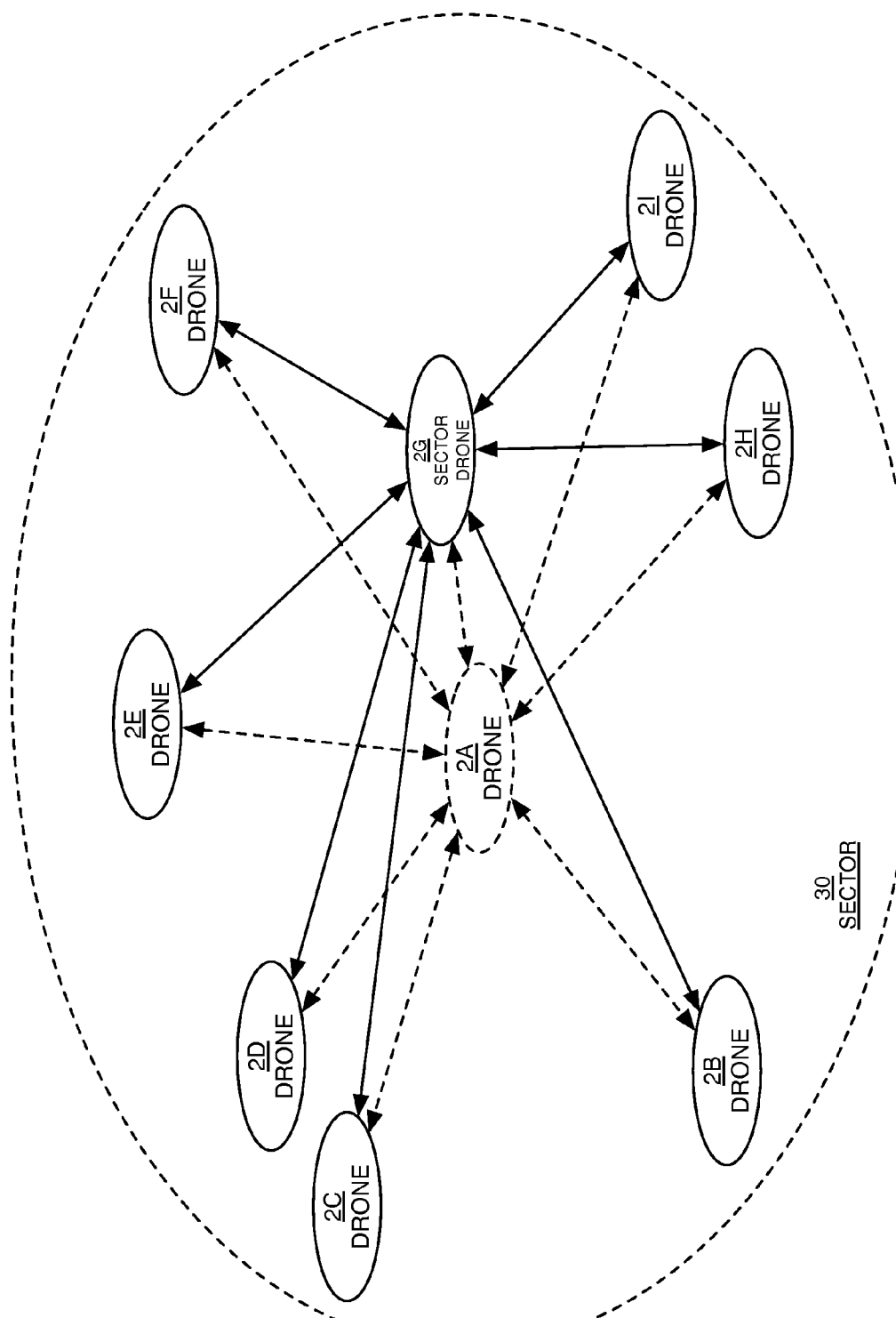
FIG. 4 is a block diagram illustrating a sector drone handoff.

FIG. 4 is a block diagram illustrating a sector drone handoff. In some circumstances, it may be required for the role of the sector drone to change from one drone in a sector to another. For example, if it is desired for the role of the sector drone to be assumed by the drone most central in a particular sector of drones, then it may occur that the most central drone may change over time. Or, the sector drone may accomplish its flight and no longer be part of the sector. Or, the sector drone may disconnect from the group such as in the case of malfunction or other communication error. In any event, when it is desired to change the role of the sector drone, then handoff will occur as shown in FIG. 4. There, the role of roving sector done is being handed off to drone 2G. This will be communicated to all of the drones in the grouping so that they will communicate with drone 2G rather than drone 2A for the functionality provided by the sector drone. Alternatively, this change in role may be dictated by the drone traffic management system 100 if desired.

Drone Handoff Between Sectors

Figure 5:
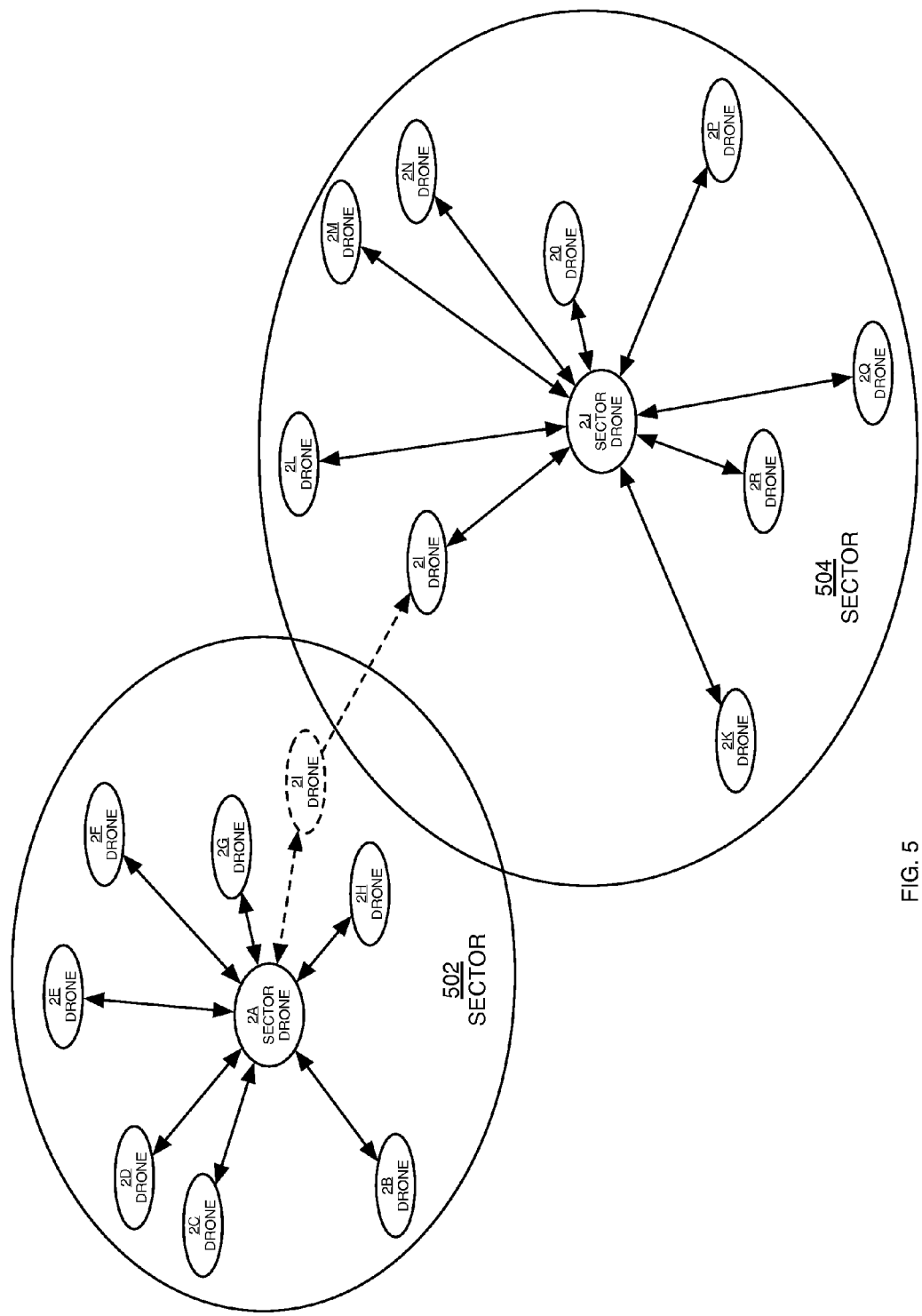
FIG. 5 is a block diagram illustrating a drone handoff between sectors.

In some instances, a drone may change is physical location with respect to its sector such that enters the boundaries of a different sector. Thus, FIG. 5 is a block diagram illustrating a drone handoff between sectors. Sector 502 includes drones 2A, 2B, 2C, 2D, 2E, 2F, 2G, 2H, and 2I. Sector 504 includes drones 2J, 2K, 2L, 2M, 2N, 2O, 2P, 2Q, and 2R. In this example, drone 2I is initially a part of sector 502, but due to its flight path has (intentionally or unintentionally) veered closer to sector 504. Drone 2I will thus be handed off from sector 502 to sector 504. In particular, drone 2I will broadcast its presence to sector drone 2J, and when it is determined that the sector handoff should occur, then drone 2I will separate from sector drone 2A of sector 502 and communicate with sector drone 2J of sector 504.

Master Drones

Figure 6:
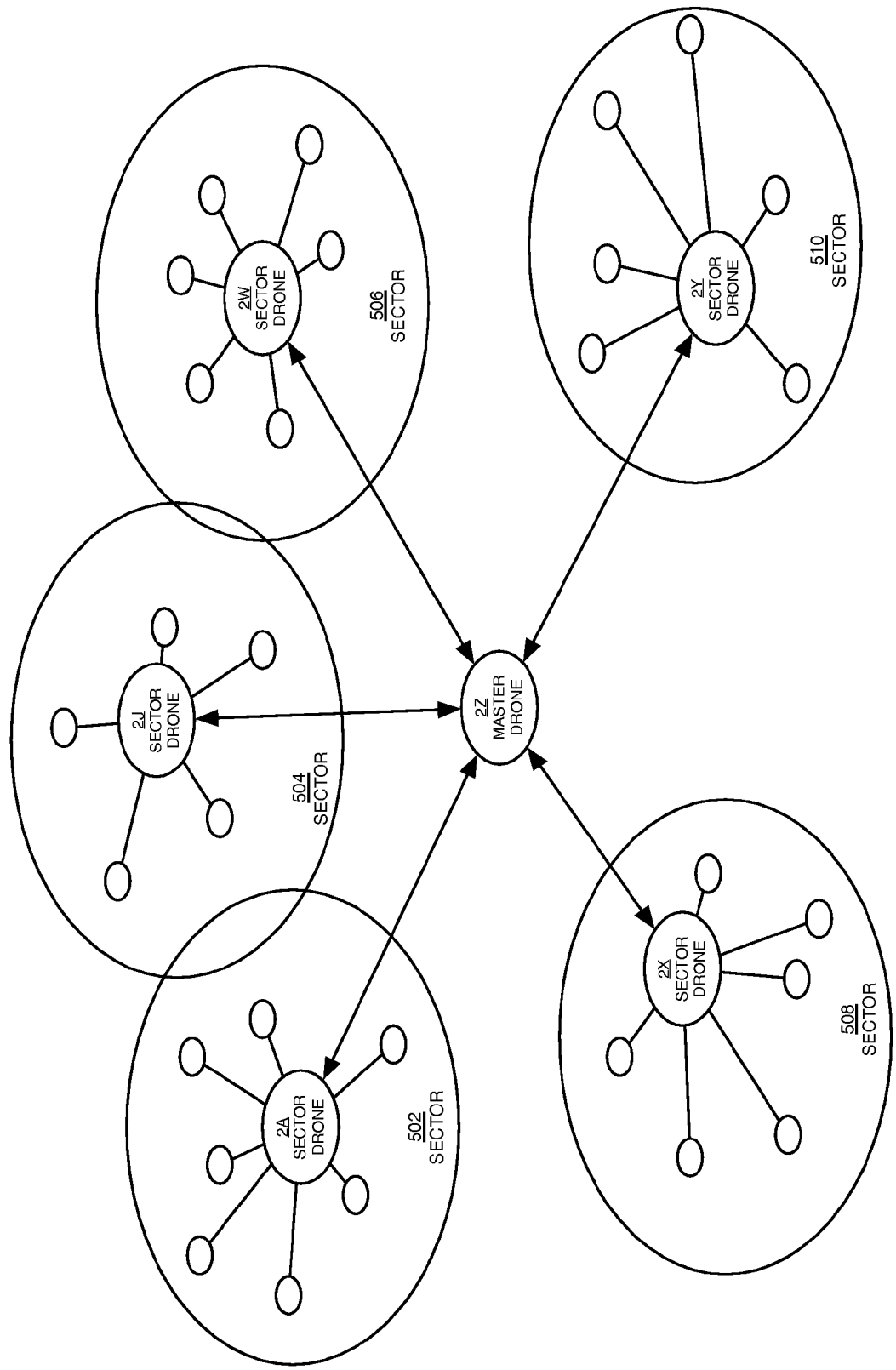
FIG. 6 is a block diagram illustrating a fourth embodiment in which multiple sector drones are controlled by a master drone of the present invention.

FIG. 6 is a block diagram illustrating a fourth embodiment in which multiple sector drones are controlled by a master drone of the present invention. In this embodiment, there are multiple sectors of traveling drones, referred to in FIG. 6 as sector 502, sector 504, sector 506, sector 508, and sector 510. More or less sectors may exist in any given situation. As the drones in these sectors travel about the region, it may be desired for the sectors to interoperate with each other via a drone that is referred to as a master drone 2Z. Master drone 2Z may be any one of the drones 2 in any sector as may be appropriate given its location at a given moment in time, or it may be a dedicated drone that operates mostly or only as a master drone. The master drone will communicate with each sector drone as shown in FIG. 6. The presence and flight paths of each drone in a sector is controlled by the sector drone (2A, 2J, 2X 2W, 2Y), and that information may be communicated up one level to the master drone 2Z so the master drone may ensure there are no conflicts. If it appears that there may be a flight conflict, then the master drone would communicate with the sector drone to alert it of the conflict so it may change the course of the conflicting drone in its sector. Thus, the master drone is the master traffic cop that ensures smooth functionality of all sectors and all drones in a sector throughout operation of the system. The master drone 2Z may also communicate with the drone traffic management system 100 if desired.

In any of the embodiments described herein, a load-balancing schema may be implemented to ensure that no single sector drone or master drone is overloaded when there is excess capacity on other similar drones. Thus, the drone traffic management system 100 will keep track of the sector drone assignments to ensure that load are balanced amongst the sector drones, which may be accomplished by dynamically re-assigning individual drones from one sector drone to another if desired to maintain a balanced load across the system. This intelligence may be executed by the drone traffic management system 100, by a master drone, or by any of the sector drones if desired.

User Access of Drones

Figure 8:
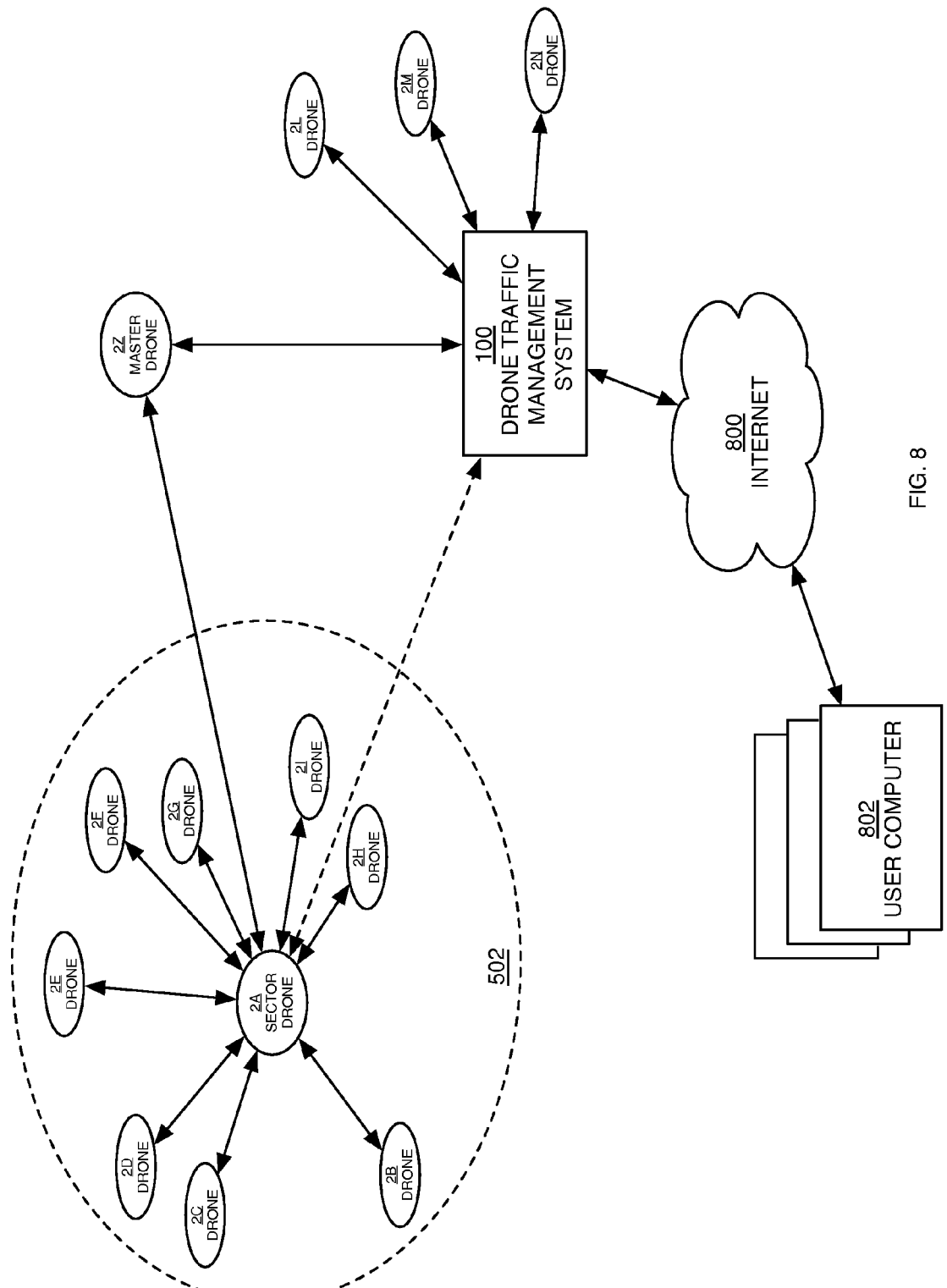
FIG. 8 is a block diagram illustrating a fifth embodiment in which individual, sector and master drones are accessed by the drone traffic management system and a user computer via the Internet.

FIG. 8 is a block diagram illustrating a fifth embodiment in which individual, sector and master drones are accessed by the drone traffic management system 100 and a user computer 802 via the Internet 800. In this embodiment, a user may be given controlled access to the functionality of the drone traffic management system 100 and/or the master drone 2Z, a sector drone such as sector drone 2A, and/or individual drones such as drones 2L, 2M, or 2N that may not be part of a sector. A web server executing on the drone traffic management system 100 may enable to the user to view the operation and flight status of any or all of the drones in the system. For example, in the case in which a user is expecting a delivery of a package, he may be given tracking information similar to the tracking number provided by prior art courier services such as FEDERAL EXPRESS or UPS. The user could at any time enter his tracking information into the web site provided by the drone traffic management system 100 and see where the drone is that is delivering his package.

By providing a user with limited access to the drone system of the present invention, a user may be able to rent the services of a drone on a timeshare basis or otherwise. For example, a user may desire to send a small package such as documents to someone in a region that is serviced by the drone system. The user may log onto the system and specify the origin and destination points for the delivery, as well as other information such as package size, contents, weight, delivery time requirements, etc. A drone may be assigned to the requested delivery, and that drone would be routed to the place of origin of the delivery so it may pick up the package. After the drone arrives and the user attached the package to the drone, the drone would then complete its task in accordance with the teachings of this invention. The user could track the travels of the drone as it makes its way to the desired destination.

A user may also be given limited access to control of certain drones if desired. In this manner, drones may be assigned to routes on a periodic basis, similar to a paper route, in which the drone services the same locations (based on a subscription or ad-hoc basis) on a regular basis at or about the same time each day or on certain days of the week. Users could access the drones and their routes via an interface to the drone traffic management system 100 (e.g. a mobile app) and utilize the drones services as desired. For example a drone may be assigned to travel from its origin to a destination at 9 AM every Tuesday, and make pre-assigned stops along the way.

Dynamic Drone Zoning

Figure 9:
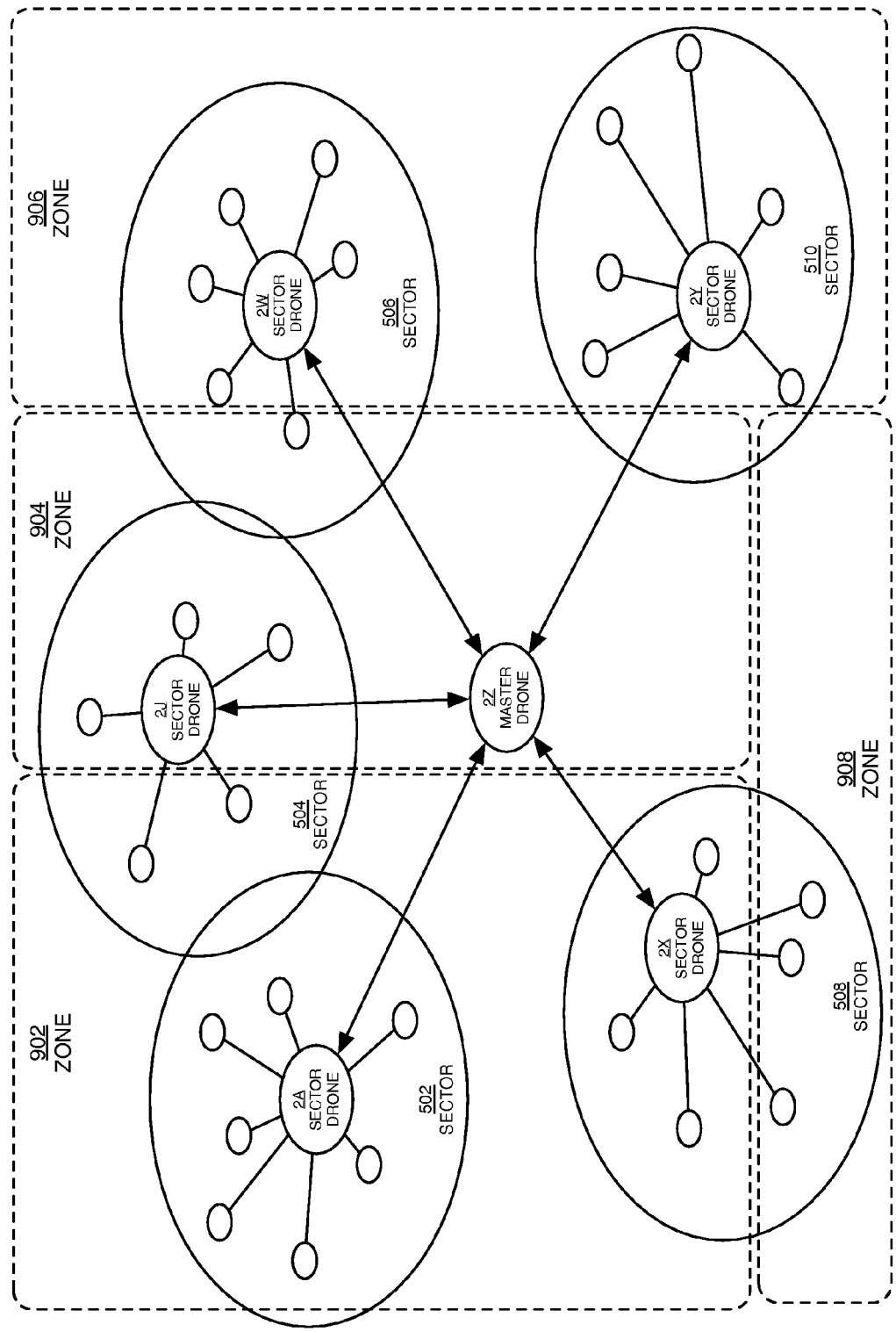
FIG. 9 is a block diagram illustrating a sixth embodiment in which a region is divided into multiple logical zones for controlling individual, sector and master drones.

FIG. 9 is a block diagram illustrating a sixth embodiment in which a region is divided into multiple logical zones for controlling individual, sector and master drones. As described above, sectors of drones are defined based generally on physical criteria, such as the number of drones available, their proximity to each other, their ability to communicate over predefined distances, and the like. For example, in order for drones to exist in the same sector, they must be able to communicate with at least the sector drone, and preferable with all other drones in the sector for maximum efficiency. In this sixth embodiment, logical zones are defined that segregate drones according to some logical schema as desired, irrespective of their location within a given sector. Thus, the sector layout of FIG. 9 corresponds to that of FIG. 6, with the addition of four logical zones that are defined as zone 902, zone 904, zone 906 and zone 908. The drones in each of these zones may be addressed by their zone number (in addition to their sector number and/or their unique drone identification number).

These logical zones may defined for any purpose desired. For example, in one embodiment, a zone could be defined to cover a certain geographical or geo-political region such as a state, county, city, municipality, and the like. That is, a group of drones may belong to a particular sector that, due to physical capabilities of the drones, may stretch out over a state boundary such that some drones in a sector are in state A and other drones in the sector are in state B. Such is the case in FIG. 9, in which sector 504 extends over zone 902 as well as zone 904. Thus, if only those drones in zone 902 are to be addressed, this may be accomplished via zone addressing which will be described in further detail below.

Drone Status Data

Figure 10:
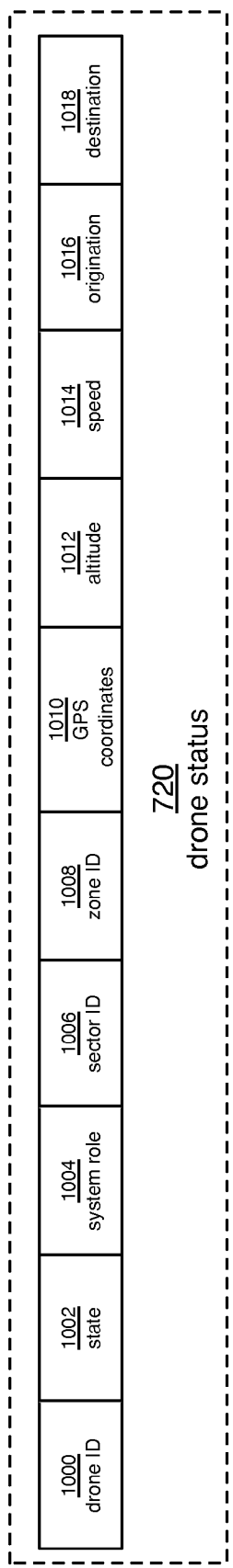
FIG. 10 is an exemplary data structure utilized by the drones of the present invention.

FIG. 10 illustrates an exemplary data structure 720 utilized by the drones of the present invention. Data structure 720 includes a drone ID 1000, drone state 1002, system role 1004, sector ID 1006, zone ID 1008, GPS coordinates 1010, altitude 1012, speed 1014, origination 1016 and destination 2018. Other pieces of information may be included in structure 720, or this data may be separated logically into multiple structures, etc. Thus, the structure 720 is exemplary only and non-limiting within the context of the present invention.

Drone ID 1000 is a unique identifier, such as a serial number, that serves to uniquely identify the drone within the system. This may be used to communicate with a particular drone rather than a group of drones, if desired.

Drone state 1002 provides status information of the drone, such as IN FLIGHT, PARKED, OFFLINE, LOW POWER, MALFUNCTION, STAGING, REPAIR, OUTBOUND, INBOUND, and the like. Further information may also be provided, such as if the state is MALFUNCTION, the cause of the malfunction may be provided. System role 1004 indicates the role of the drone in the system, which may for example be STANDARD, SECTOR DRONE, or MASTER DRONE. These roles are described in detail above.

Sector ID 1006 indicates the identification number of a sector that the drone may be assigned to. For example, drone 2E in FIG. 5 would have a sector ID of 502, while drone 2M in FIG. 5 would have a sector ID of 504. Zone ID 1008 indicates the identification number of a zone that the drone may be assigned to. For example, all of the drones in sector 502 in FIG. 9 would have a zone ID of 902, while some drones in sector 504 in FIG. 9 would have a zone ID of 902 and other drones in sector 504 would have a zone ID of 904, as illustrated.

GPS coordinates 1010 indicate the coordinates of the drone at any given time, such as LATITUDE=40.845 N, LONGITUDE=72.793 W, or any type of coordinate system that may be useful to the system. Altitude 1012 indicates the altitude of the drone at any time, such as 450 FEET. Speed 1014 indicates the speed of the drone at any time, such as 20

MPH. Origination 1016 indicates the point of origin of a drone for a particular trip, and destination 2018 indicates the point of destination of the drone for that trip. This may be provided in any format desired, such as an address or a set of GPS coordinates.

Drone Functional Blocks and Features

The drones utilized in the present invention provide various functionalities and features that will now be described with respect to FIG. 7. Flight control module 704 operates to control the flight mechanisms of the drone as known in the art. For example, a popular type of drone in use is also known as a quadcopter since it has four independently controlled propellers. The operation of these propellers would be controlled by the flight control module 704 to operate the drone from its origin to its destination along the flight path, which may of course be modified in real time as the drone travels en route to its destination. Generally speaking, quadcopters use two sets of identical fixed pitched propellers; two clockwise and two counter-clockwise. These use variation of RPM to control lift and torque. Control vehicle motion is achieved by altering the rotation rate of one or more rotor discs, thereby changing its torque load and thrust/lift characteristics. This type of control is generally known in the art and need not be repeated herein.

GPS/location services module 706 is also a function that is generally know in the art. This module is essentially a GPS receiver that determines its coordinates by communicating with the GPS satellite system and provides that information to GPS coordinate status 1010 in FIG. 10.

Payload control mechanism 708 provides control of a mechanical subsystem (not shown) that enables the drone to latch onto a payload such as documents, packages, medicine, currency, etc. The format of the mechanical subsystems that may be utilized to latch onto the payload would of course vary based on its intended use, and is beyond the scope of the present application. Thus, the payload control mechanism is programmable to interoperate with the mechanical payload subsystem in order to grab the payload, hold the payload, and release the payload, as may be desired.

As the power capability of a drone is always a consideration, in particular when the drone must travel along an extended route, the present invention provides for one or more solar panels to be affixed to the drone in a manner to capture rays from the sun as the drone is travelling. Solar energy control module 710 interoperates with these panels to obtain electrical energy from the panels for powering the drone, and optionally to control the positioning of the panels in order to obtain maximum solar collection efficiency.

The drones in the present invention have the ability to capture images, video, and/or sounds as the drone travels along its route. This may be accomplished by devices as simple as a microphone or still or video camera, as known in the art. These sounds and images may be captured and recorded for later playback if desired. In the alternative, a real-time feed of sounds and images or video streams may also be provided via wireless communication module 702 back to the drone traffic management system 100 or another system adapted for receiving the feeds from the drone. Capturing images/videos/sound of the local environment may also be used by the on-board drone traffic management module 700, alone or in conjunction with the drone traffic management system 100, in order to adapt the flight path of the drone in real time. For example, a drone may capture an image of a building in its immediate flight path, and the system may change its route so as to avoid hitting the building, all in an automated manner.

Wireless communication module 702 provides one or more ways for the drone to communicate wirelessly with other drones, as well as with the drone traffic management system 100.

Drone registration tables 714 are an area in memory that indicates the status of the drone itself as well as drones that may be located nearby, and/or which may be in the same sector and/or zone as that drone. For example, these tables may contain a list of all drones that are in the same sector as the drone, and it may contain a list of all drones that are in the same zone as the drone. In one embodiment, every drone in the system is listed in these tables 714 along with its status, sector ID, and zone ID. The identification of any or all sector drones and master drones may also be provided in these tables. Essentially any information that relates to the identification and status of the drones in the system may be set forth in these tables so as to give the drone more intelligence as to the operation of the system.

Weather and other environmental sensors 716 provide sensing of various weather conditions such as wind and rain, air quality etc. As one example, this information is of course useful for the system to calculate and adjust the flight path of the drone as it travels. For example, if the conditions around the drone get windy, the system may reroute the drone so as to avoid the windy conditions.

Security control module 718 provides security features to the drone in order to keep the payload (as well as onboard information) secure. Various security mechanisms as known in the art may be implemented, such as passcode entry or biometric readers (e.g. voice, fingerprint, retina, etc.). In some embodiments, it may be required for the recipient of the payload to pass the security module in order for the payload to be released, while in other embodiments the payload may be automatically released when the drone reaches its destination.

The security control module also may control secure communications between the drones as well as between the drone and the drone traffic management system 100. Various types of security protocols as known in the art may be utilized, such as data encryption.

The security control module may also act in case of an attempt to hack into or overtake control of the drone by a third party. In the vent of such an action, then the security control module would act to disable certain portions of or all of the functionalities of the drone, rendering it useless to a third party takeover. This functionality may be supplemented by the drone traffic management system 100 and/or other drones in the system.

Zone status information 720 provides various pieces of information about the status of the drone, including for example the drone ID 1000, drone state 1002, system role 1004, sector ID 1006, zone ID 1008, GPS coordinates 1010, altitude 1012, speed 1014, origination 1016 and destination 2018 as described above with respect to FIG. 10.

Drone Traffic Management

Figure 11:
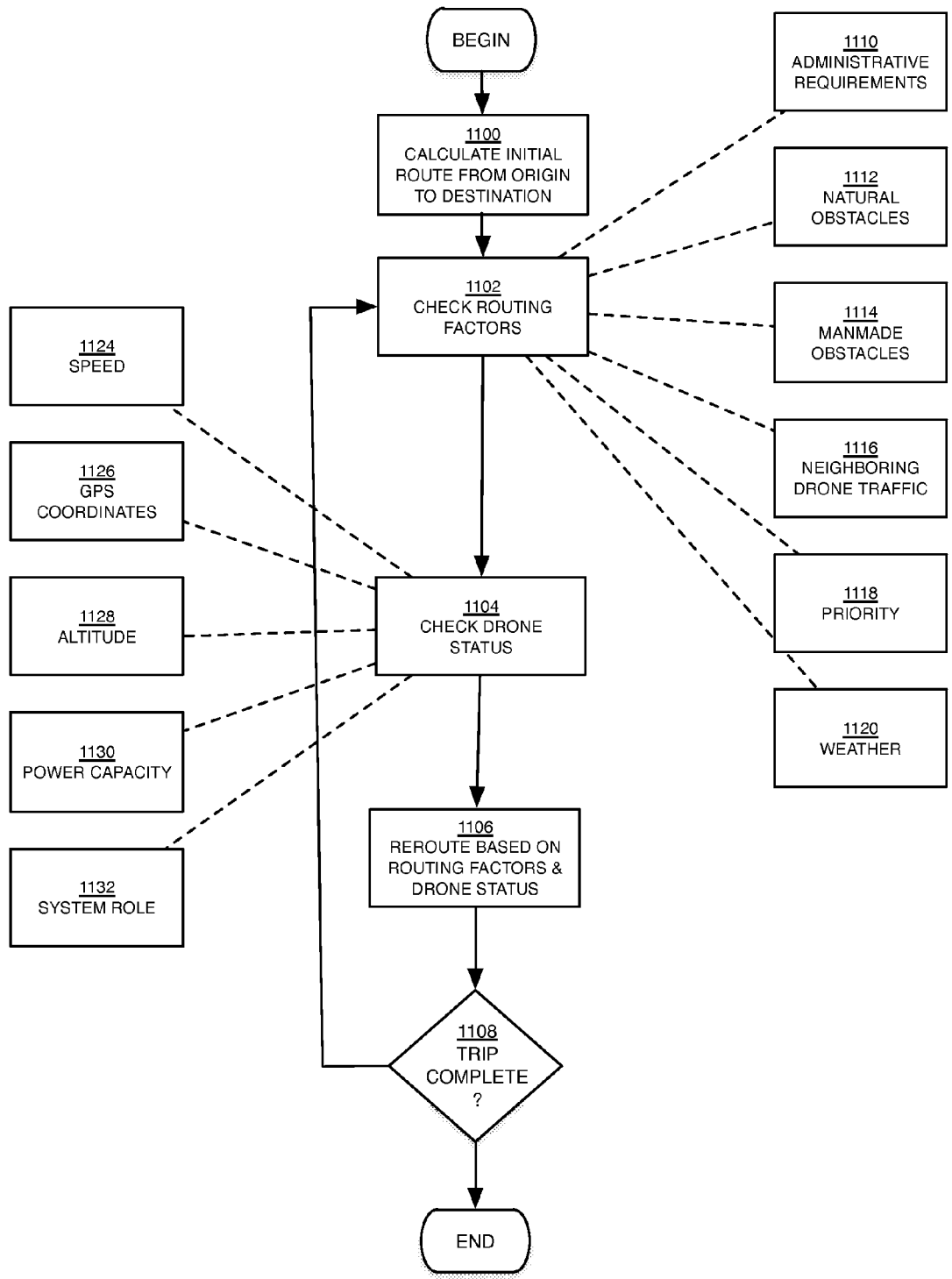
FIG. 11 is a flowchart of the traffic management methodology of the present invention.

FIG. 11 is a flowchart of the traffic management methodology of the present invention. The drone traffic management module 700, acting alone or in combination with the drone traffic management system 100, is one of the core services provided in accordance with this invention. The drone traffic management module 700 and/or drone traffic management system 100 executes the methodology of the flowchart of FIG. 11 as follows. Initially, the process begins when a route is requested to be calculated. The first step 1100 is to calculate the initial route from the origin to the destination. This may be done is a simple straight path so as to provide the quickest trip time. FIG. 12*a* illustrates a simple, essentially direct path determined for drone 2 to travel from origin 1200 to destination 1202. This is a cross-sectional view, showing that the drone will elevate a certain amount over the ground, which in this example is relatively flat. The next step in the process is step 1102, in which the various routing factors are checked to determine if the route will be affected. These routing factors include but are not limited to administrative requirements 1110, natural obstacles 1112, manmade obstacles 1114, neighboring drone traffic 1116, route priority 1118, and weather conditions 1120. In addition, the status of the drone is checked at step 1104, including its speed 1124, its location (GPS coordinates 1126), its altitude 1128, its remaining power capacity 1130, and its system role 1132. Next, at step 1106, the drone may be rerouted based on an analysis of the routing factors 1102 and the drone status 1104. This analysis and rerouting process will repeat until the trip is completed at decision box 1108.

The routing factors 1102 are now described in further detail. Administrative requirements 1110 include various parameters established by regulatory agencies such as the FAA and the like, which will dictate how high the drone may travel over the ground, speed of the drones, requirements to avoid airports or other types of regions, etc. The administrative requirements 1110 generally will not vary and are stored in local memory and/or accessed from a remote server computer via a network such as the Internet. For example, if the initial route 1204 calculated from the origin 1200 to the destination 1202 would take the drone 2 over an airport, and an administrative requirement states that a drone may not come within a half mile of an airport, then the initial route 1204 will be modified at step 1106 to reroute the drone around the airport so as to comply with that requirement.

Natural obstacles 1112 and manmade obstacles 114 include various types of obstacles that would get in the way of the drone getting to the destination 1202. These obstacles may be referenced from a database that is stored in local memory and/or accessed from a remote server computer via a network such as the Internet. For example, FIG. 12B illustrates that an obstacle consisting of a group of buildings 1206 is in the initial route 1204. As such, the initial route 1204 will be modified at step 1106 to reroute the drone over (or around) the buildings 1206 so as to avoid any collisions with them by taking modified route 1208. In addition, images of obstacles may be obtained via an onboard camera, and that information may be used in the same manner.

Figure 12C:
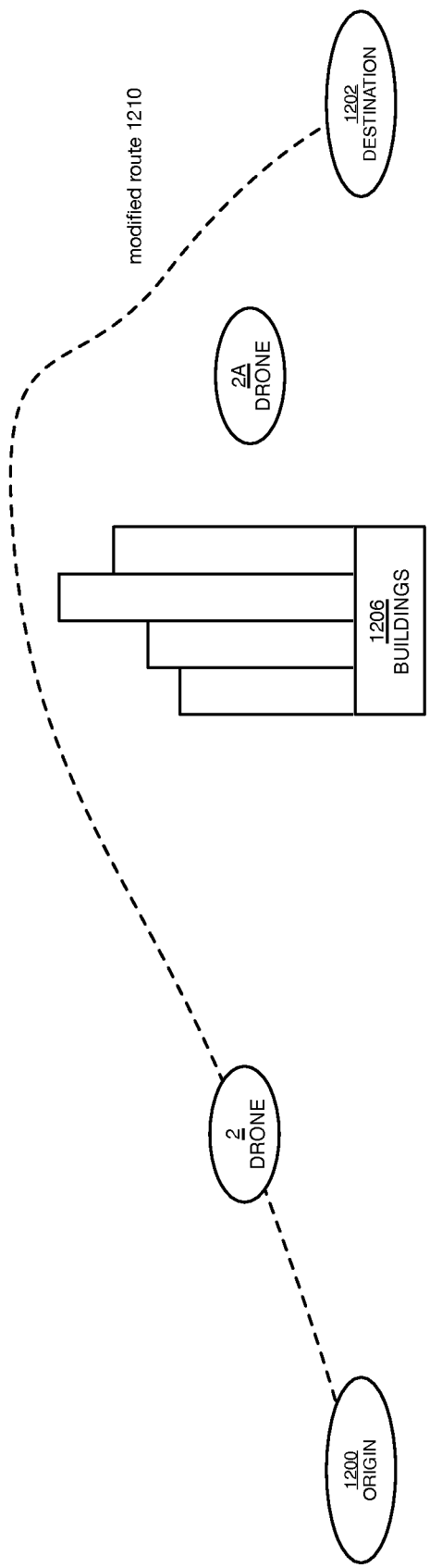

Neighboring drone traffic 1116 will provide the drone traffic management module 700 and drone traffic management system 100 with the ability to ensure that the drone 2 does not collide with another drone 2A that may be flying in the vicinity of the drone 2. All of the routing and flight information for each drone is stored at the drone traffic management system 100 and continuously updated and revised, so this process is very dynamic in order to ensure there are no drone-to-drone collisions. For example, as shown in FIG. 12*c*, a second drone 2A may be in the vicinity of the route being traveled by the drone 2. In this situation, the drone traffic management module 700 and/or drone traffic management system 100 will calculate another modified route 1210 that will be uploaded to the drone 2 so as to avoid collision with the drone 2A. In the alternative, the route of drone 2A may be modified instead, if it more efficient to do so.

Route priority 1118 will also be considered in calculating the route of the drone as well as any potential rerouting at step 1106. For example, in FIG. 12*c*, if drone 2 has a high priority status (e.g. it is transporting medicine) and drone 2A has a low priority status, then the route of drone 2 may not be modified in order to avoid collision with drone 2A if such modification would unduly delay the arrival of the high priority drone 2; instead, the route of drone 2A will be modified so as to avoid the collision with drone 2.

Weather conditions 1120 may also cause rerouting of the drone at step 1106. For example, if a storm is in the intended path of a drone, then it may be rerouted in order to avoid the storm.

The drone status factors 1104 are now described in further detail. The speed 1124, GPS coordinates 1126, and altitude 1128 are continually monitored to ensure the drone is traveling properly along the intended route, and the route may be modified at step 1106 to compensate for any variations of these factors. The power capacity 1130 may affect the route, since it must be ensured that drone will have enough power to complete the trip along the planned route; if not then there may be a modification to that route to ensure compliance. The system role 1132 may also play a part in the routing and rerouting of the drone. For example, if a drone is assigned the role of a sector drone, it may be rehired to stay within the sector of drones to which it has been assigned.

Inter-Drone Communications

Drones may communicate with each other in various ways, including but not limited to:
 drone to drone
 drone to sector drone
 sector drone to master drone
 drone to master drone
 drone to drone traffic management system 100
 sector drone to drone traffic management system 100
 master drone to drone traffic management system 100

Communications may be set on primary levels, such as drone to sector drone, and then secondary levels, such as drone to master drone or drone to drone traffic management system 100. The secondary level may be initiated in the event that primary communications fail. Thus, for example, in FIG. 8, drone 2B may be configured to communicate primarily with sector drone 2A. If for some reason that communication cannot occur (e.g. such as failure of sector drone 2A, a breakdown in communications with sector drone 2A, etc.), then drone 2B may then communicate with the master drone 2Z if it is within range of master drone 2Z. Or, drone 2B may instead communicate directly with the drone traffic management system 100 if it is within range of that system (or within range of a network device that in turn communicates with the drone traffic management system 100). Or, drone 2A may communicate with another drone in its sector such as drone 2H (which in turn could then communicate with the master drone 2Z or the drone traffic management system 100 if it is in a better position than drone 2B to do so.

In sum, if a primary communications condition fails, then any drone may be adapted to communicate with any other component in the system within its communication range (including other drones, sector drone, master drones, and/or the drone traffic management system 100) as may be desired by the system designer. In the event the primary communication path may be re-established, then the initial communications mode may be re-established.

Drone prioritization is a function of the present invention in which the system will prioritize drone communications to ensure that system optimization occurs. For example, certain drones may take on a mission that has a higher priority than others (e.g. delivery of medicine, civil defense systems), and the drone traffic management system 100 will prioritize communications with those drones, and will give those drones priority of flight paths over others.

Various Drone Functionality and Features

Drones may be color coded for ease of identification, such as using a red drone for high importance deliveries, blue drones for surveillance, white drones as sector zones, black drones as master drones, etc.

Drones may execute the functionality of a wireless beacon, such as the beacons in use for e-commerce applications that enable peripheral devices to interoperate with the beacon/drone as desired. This enables controlled advertisements to be made in conjunction with the drone/beacon, which would be made to be mobile since the beacon would travel with the drone rather than be stationary.

An additional security feature of the drone may be for it to be EMP hardened so as to protect it against attacks such as electromagnetic pulse or the like. This makes the drone system of the present invention especially useful in hostile environments and/or in time of war.

The drone may have an onboard package scanner or sensor that could be used to detect the presence of an illegal payload or other contraband. For example, sensors may be strategically placed onboard the drone to detect if it is being used in an attempt to deliver illegal drugs.

The drone may be equipped with broadcast transmission capabilities so as to provide a mobile broadcasting unit. For example, radio, television, and/or data transmissions may be made via the drone to remote locations that otherwise cannot receive those broadcasts. An additional function would be to provide commercial advertisements or public service announcements to such remote areas, such as in the event of an emergency, evacuation, or natural disaster. The drone could carry a prerecorded announcement in on onboard storage device, or it could receive real-time transmissions and rebroadcast them if desired.

Security monitoring may be an additional feature of the drones of the present invention. By using the onboard sound/image/video capture and streaming functionality described above, the drone could enter a dangerous or remote area and provide the desired security functions.

By providing package delivery functionality, the drones act as a private post office or courier service that can quickly service a remote area in an inexpensive and efficient manner. In addition, the drones may be used by governmental agencies such as the police to transfer evidence quickly and securely from a crime scene to the evidence repository such as a police station. Likewise, the present invention could form the basis of a medicine delivery system.

The present invention may be used in a commercial manner to provide drone transport rentals and time sharing functionalities. This would enable users such as consumers to access the system and use the drones on an as-needed basis (see FIG. 8). For example, users may be charged for the drone usage based on any combination of the following criteria: weight of the payload, distance the payload must travel, amount of time the drone is being used, and/or a priority schema in which high priority deliveries (direct routing) would cost more than lower priority ones (indirect routing).

Surveillance functions may also be implemented by the drones in this system, in which the camera and image functionalities (as well as other relevant sensors) may be utilized to provide real time as well as recorded feeds back to the drone traffic management system 100 for processing and taking further actions if desired.

The image sensing functionalities may be used (along with heat sensing or other types of sensing technologies) for traffic and crowd control. For example, a drone or grouping of drones (physical or logical group) may be used to ascertain large volumes of people or vehicular traffic in a given area, and the drones or the drone traffic management system 100 or a related system may help in rerouting that traffic so that pressure and congestion is alleviated. So, a drone may monitor a portion of a roadway, calculate traffic load, and feed that information back to drivers in that area so they may make informed decisions as to subsequent traffic patterns (e.g. reroute themselves manually or automatically). Likewise, law enforcement personnel may use the drones and system of this invention as an aid in law enforcement such as with surveillance and other crowd monitoring techniques.

Drones may land in concert with various types of guidance systems, including but not limited to laser-based landing systems and the like.

The drone traffic management system 100 implements a scheduling system that ensures drone can take off, fly, and land in a systematic fashion.

Although the preferred embodiments of the invention have been described above by way of example only, it will be understood by those skilled in the art that modifications may be made to the disclosed embodiments without departing from the scope of the invention. Furthermore, various embodiments described herein or portions thereof can be combined without departing from the present invention. The above-described embodiments of the present invention are presented for purposes of illustration and not of limitation, and the present invention is limited only by the claims that follow.

What is claimed is:

1. A drone traffic management system comprising a computer comprising:
   memory means for storing
      origin coordinates indicating an origin location of a drone,
      destination coordinates indicating a destination of the drone, and
      traffic management factors located between the origin location of the drone and the destination of the drone, the traffic management factors comprising a flight path of a second drone; and
   processing means for controlling a flight path of the drone by
      calculating an initial flight path for the drone to fly automatically from the origin location to the destination location without manual intervention,
      sending the initial flight path to the drone,
      continuously revising the flight path of the drone by repeating, until the drone reaches its destination, the steps of:
         receiving location data of the drone as it travels from the origin location to the destination,
         receiving location data of the second drone as the second drone travels along its flight path,
         calculating a revised flight path of the drone as a function of the location data of the drone and the location data of the second drone, and sending the revised flight path to the drone
wherein the processing means is adapted to control the flight of a plurality of drones, and wherein one of the plurality of drones is a roving sector drone, and wherein the computer is located onboard the roving sector drone.

2. The drone traffic management system of claim 1 wherein the traffic management factors further comprise at least one of weather parameters, natural barrier locations, manmade barrier locations.

* * * * *